(12) United States Patent
Kozono et al.

(10) Patent No.: US 12,491,874 B2
(45) Date of Patent: Dec. 9, 2025

(54) DRIVING ASSISTANCE APPARATUS, METHOD, AND NON-TRANSITORY RECORDING MEDIUM FOR VEHICLE TRAJECTORY PREDICTION AND COLLISION DETERMINATION

(71) Applicant: SUBARU CORPORATION, Tokyo (JP)

(72) Inventors: Kazuya Kozono, Tokyo (JP); Takamichi Kirihara, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 237 days.

(21) Appl. No.: 18/466,142

(22) Filed: Sep. 13, 2023

(65) Prior Publication Data

US 2024/0123981 A1    Apr. 18, 2024

(30) Foreign Application Priority Data

Oct. 12, 2022  (JP) ................................. 2022-164085

(51) Int. Cl.
*B60W 30/095*  (2012.01)
*B60W 30/09*   (2012.01)
*B60W 40/114*  (2012.01)

(52) U.S. Cl.
CPC ........ *B60W 30/0953* (2013.01); *B60W 30/09* (2013.01); *B60W 30/0956* (2013.01); *B60W 40/114* (2013.01); *B60W 2520/06* (2013.01); *B60W 2520/14* (2013.01)

(58) Field of Classification Search
CPC ............. B60W 30/0953; B60W 30/09; B60W 30/0956; B60W 40/114; B60W 2520/06; B60W 2520/14; B60W 2554/805; B60W 50/0097; B60W 30/095
See application file for complete search history.

(56) References Cited

U.S. PATENT DOCUMENTS

| 2004/0079145 | A1* | 4/2004 | Kin .................. | B60C 23/061 73/146 |
| 2010/0292887 | A1* | 11/2010 | Becker ............... | B60R 21/0132 701/31.4 |
| 2015/0291160 | A1* | 10/2015 | Kim .................... | B60W 30/16 345/633 |

(Continued)

FOREIGN PATENT DOCUMENTS

JP    2021-187207 A    12/2021

*Primary Examiner* — Daniel M. Robert
(74) *Attorney, Agent, or Firm* — Rimon P.C.

(57) ABSTRACT

A driving assistance apparatus includes an electronic control unit. The electronic control unit: calculates a yaw rate change rate of a first vehicle to which the driving assistance apparatus is to be applied, based on a yaw rate of the first vehicle obtained at multiple time points; predicts a sequential position of the first vehicle as a first vehicle position assuming that the yaw rate change rate is kept constant; predicts a sequential position of a second vehicle as a second vehicle position; determines whether contact occurs, based on presence or absence of a contact position where the first vehicle position partly overlaps with the second vehicle position; and ends prediction of the first vehicle position and the second vehicle position, upon determining that no contact occurs until a prediction end time that is a time when the first vehicle turns by a setting angle.

11 Claims, 5 Drawing Sheets

(56) References Cited

U.S. PATENT DOCUMENTS

| | | | | |
|---|---|---|---|---|
| 2017/0061797 A1* | 3/2017 | Lee | ............... | B60W 30/16 |
| 2018/0174464 A1* | 6/2018 | Ikedo | ............... | G08G 1/166 |
| 2018/0281814 A1* | 10/2018 | Murray | ............... | B60W 30/12 |
| 2020/0269920 A1* | 8/2020 | Millsap | ............... | B60W 50/10 |
| 2020/0307582 A1* | 10/2020 | Sato | ............... | B60W 50/10 |
| 2021/0188282 A1* | 6/2021 | Zhu | ............... | B60W 30/14 |
| 2021/0370924 A1 | 12/2021 | Kuno et al. | | |
| 2022/0063615 A1* | 3/2022 | Tamura | ............... | B60W 60/0053 |
| 2023/0234578 A1* | 7/2023 | Odai | ............... | G06T 7/20 |
| | | | | 701/26 |
| 2024/0123981 A1* | 4/2024 | Kozono | ............... | B60W 40/114 |

\* cited by examiner

DRIVING ASSISTANCE APPARATUS, METHOD, AND NON-TRANSITORY RECORDING MEDIUM FOR VEHICLE TRAJECTORY PREDICTION AND COLLISION DETERMINATION

CROSS-REFERENCE TO RELATED APPLICATIONS

The present application claims priority from Japanese Patent Application No. 2022-164085 filed on Oct. 12, 2022, the entire contents of which are hereby incorporated by reference.

BACKGROUND

The disclosure relates to a driving assistance apparatus, a driving assistance method, and a non-transitory recording medium that determine whether contact of a vehicle occurs.

A known technique predicts a contact position between an own vehicle and another vehicle (a target vehicle), and performs driving assistance. Japanese Unexamined Patent Application Publication (JP-A) No. 2021-187207 discloses a driving assistance apparatus that assumes that an own vehicle travels straight while keeping a current speed, and that a target vehicle keeps a current speed. The driving assistance apparatus identifies the target vehicle as a crossing target, when the own vehicle and the target vehicle are predicted to come into contact with each other in a crossing region where a region through which the target vehicle is predicted to pass and a region through which the own vehicle passes overlap with each other. The driving assistance apparatus controls a braking device of the own vehicle to cause the own vehicle to decelerate at a deceleration rate from a time before a predicted contact time when the own vehicle and the crossing target are predicted to come into contact with each other.

SUMMARY

An aspect of the disclosure provides a driving assistance apparatus including an electronic control unit. The electronic control unit is configured to: calculate a yaw rate change rate of a first vehicle to which the driving assistance apparatus is to be applied, based on a yaw rate of the first vehicle obtained at multiple time points; predict a sequential position of the first vehicle as a first vehicle position assuming that the yaw rate change rate is kept constant; predict a sequential position of a second vehicle as a second vehicle position; determine whether the first vehicle and the second vehicle come into contact with each other, based on presence or absence of a contact position where the first vehicle position partly overlaps with the second vehicle position; and end prediction of the first vehicle position and the second vehicle position, when the electronic control unit determines that the first vehicle and the second vehicle do not come into contact with each other until a prediction end time that is a time when the first vehicle turns by a setting angle.

An aspect of the disclosure provides a driving assistance method including: calculating a yaw rate change rate of a first vehicle to which the driving assistance method is to be applied, based on a yaw rate of the first vehicle obtained at multiple time points; predicting a sequential position of the first vehicle as a first vehicle position assuming that the yaw rate change rate is kept constant; predicting a sequential position of a second vehicle as a second vehicle position; determining whether the first vehicle and the second vehicle come into contact with each other, based on presence or absence of a contact position where the first vehicle position partly overlaps with the second vehicle position; and ending prediction of the first vehicle position and the second vehicle position, when a determination is made that the first vehicle and the second vehicle do not come into contact with each other until a prediction end time that is a time when the first vehicle turns by a setting angle.

An aspect of the disclosure provides a non-transitory computer readable recording medium containing a program. The program causes, when executed by a computer, the computer to implement a method. The method includes: calculating a yaw rate change rate of a first vehicle to which the method is to be applied, based on a yaw rate of the first vehicle obtained at multiple time points; predicting a sequential position of the first vehicle as a first vehicle position assuming that the yaw rate change rate is kept constant; predicting a sequential position of a second vehicle as a second vehicle position; determining whether the first vehicle and the second vehicle come into contact with each other, based on presence or absence of a contact position where the first vehicle position partly overlaps with the second vehicle position; and ending prediction of the first vehicle position and the second vehicle position, when a determination is made that the first vehicle and the second vehicle do not come into contact with each other until a prediction end time that is a time when the first vehicle turns by a setting angle.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

A contact determination apparatus in JP-A No. 2021-187207 is effective when an own vehicle is traveling straight. However, it is difficult for contact determination to operate when the own vehicle is traveling while turning at, for example, a curve or an intersection.

It is desirable to provide a driving assistance apparatus and a driving assistance method that make it possible to, in driving assistance when an own vehicle is traveling while turning, predict a contact position and determine whether contact occurs, and a non-transitory recording medium containing a program that makes it possible to execute such a driving assistance method.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Figure 1:
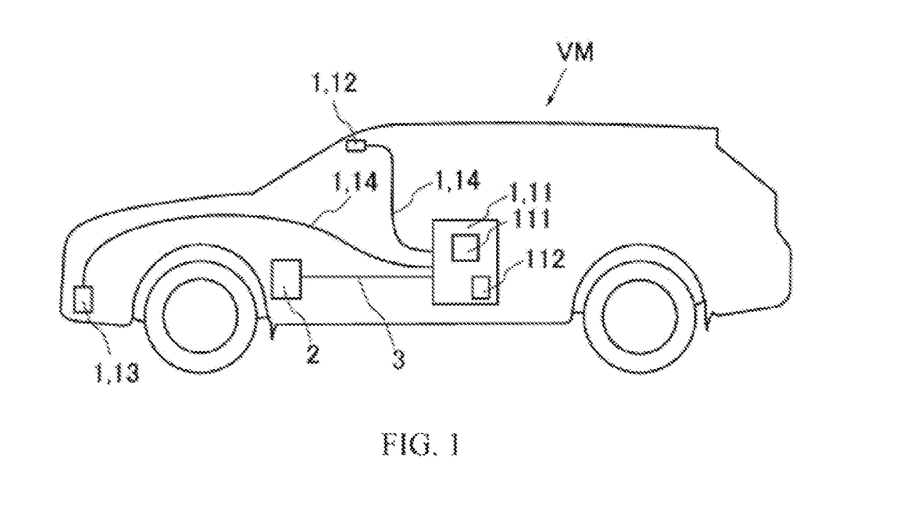
FIG. 1 is a diagram illustrating a driving assistance apparatus to be mounted on a vehicle.

FIG. 1 illustrates a vehicle mounted with a driving assistance apparatus 1 according to an example embodiment of the disclosure. The vehicle in FIG. 1 may be referred to as a vehicle VM. The vehicle VM may thus be distinguished from a vehicle (a target vehicle VS) as a target with which whether the vehicle VM comes into contact is to be determined. The vehicle VM may serve as an own vehicle. The driving assistance apparatus 1 of the vehicle VM may include an electronic control unit (ECU) 11, cameras 12, radar sensors 13, and a wiring line 14. The wiring line 14 may couple the ECU 11 to the cameras 12 and the radar sensors 13. The ECU 11 may include a central processing unit (CPU) 111 and a memory 112. Two cameras 12 may be arranged in a left-right direction in the vehicle VM. One radar sensor 13 may be disposed on each of the left and the right at the front of the vehicle VM. In addition, the ECU 11 may be coupled to a braking device 2 of the vehicle VM via a communication line 3. In one embodiment, the vehicle VM may serve as a "first vehicle". In one embodiment, the target vehicle VS may serve as a "second vehicle".

Images captured by the two cameras 12 and data detected by the two radar sensors 13 may be sent to the ECU 11 via the wiring line 14, and analyzed by the CPU 111 using software held in the memory 112. The CPU 111 and the memory 112 may configure a computer. When the ECU 11 determines that an action is to be taken in response to contact, the ECU 11 may take an action such as transmitting a braking command to the braking device 2 via the communication line 3.

Figure 2:
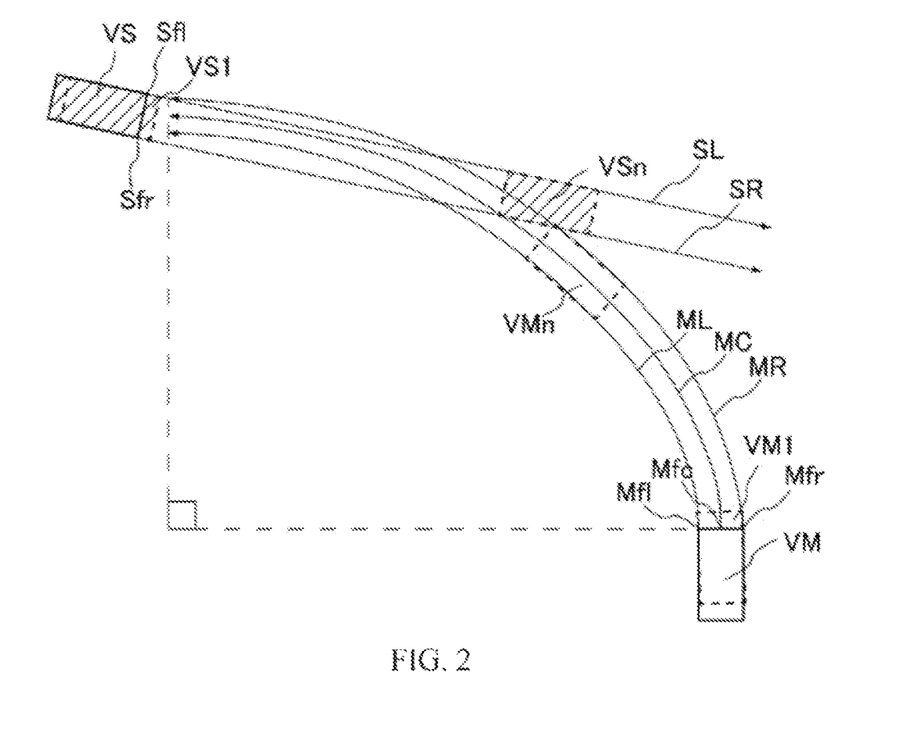
FIG. 2 is a diagram illustrating predicted traveling routes of two vehicles.

FIG. 2 illustrates predicted paths of the vehicle VM and the target vehicle VS to be used to determine contact. The vehicle VM and the target vehicle VS indicated by solid lines may be current positions at a prediction reference time Ts. A vehicle VM1 and a target vehicle VS1 indicated by dotted lines may be predicted positions of the vehicle VM and the target vehicle VS after elapse of a time period Δt. In addition, a vehicle VMn and a target vehicle VSn indicated by dotted lines may be predicted positions of the vehicle VM and the target vehicle VS at a predicted contact time. Curves indicate predicted paths of respective parts of the vehicle VM. MR, MC, and ML may respectively be predicted paths of a front right end Mfr, a front middle Mfc, and a front left end Mfl of the vehicle VM. SR and SL may respectively be predicted paths of a front right end Sfr and a front left end Sfl of the target vehicle VS. In example embodiments of the disclosure, the vehicle VM may be predicted to travel along a clothoid curve. The own vehicle middle predicted path MC may be a clothoid curve. In addition, the own vehicle right predicted path MR and the own vehicle left predicted path ML may be obtained from a vehicle width of the vehicle VM and the own vehicle middle predicted path MC.

Figure 3:
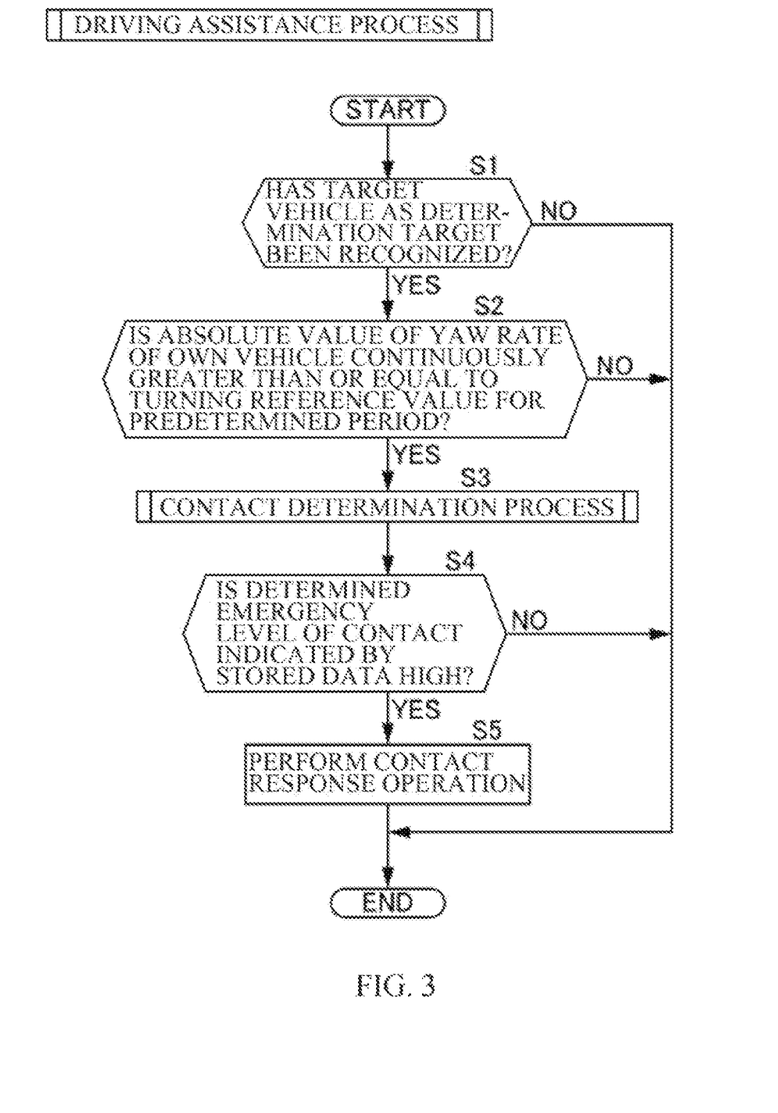
FIG. 3 is a flowchart illustrating a driving assistance process.
Figure 4:
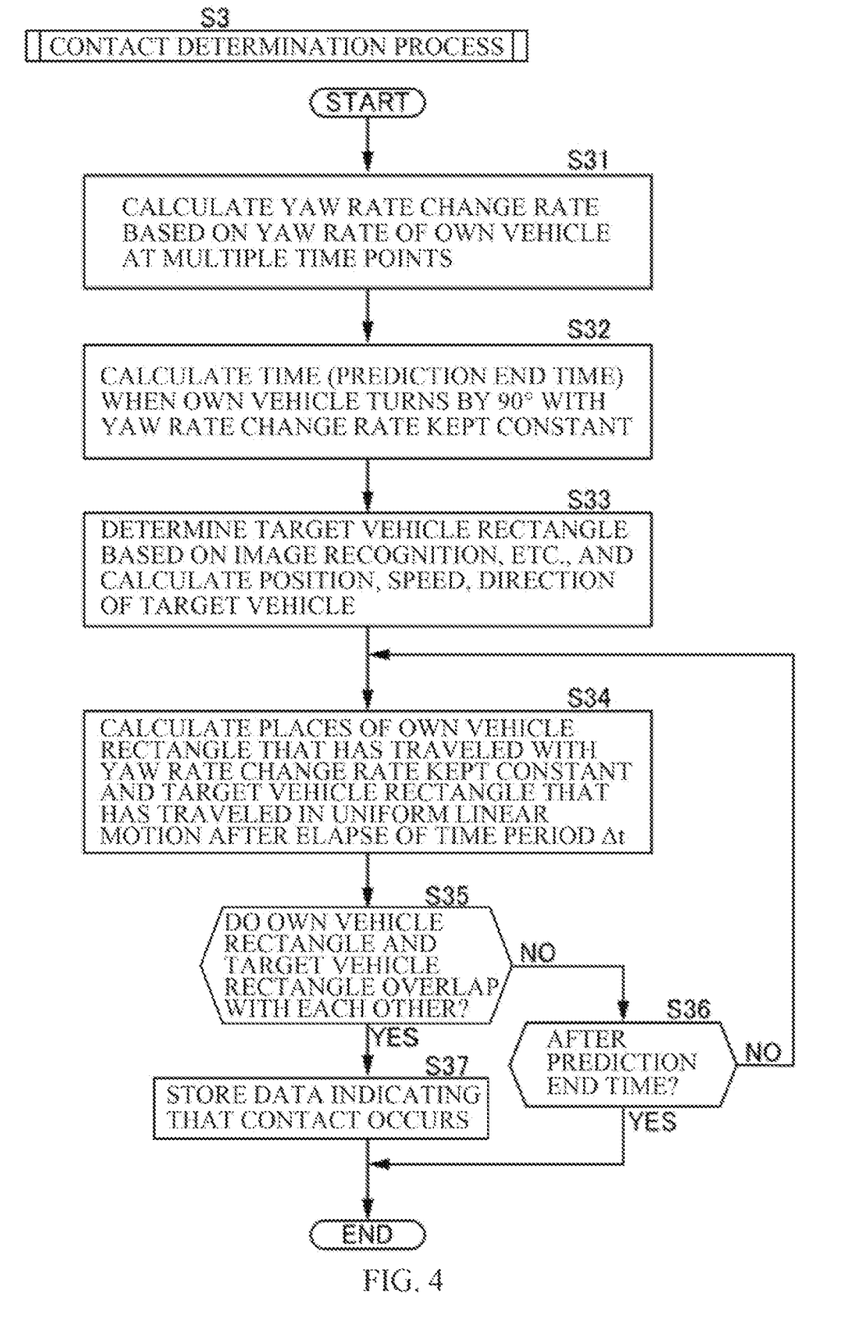
FIG. 4 is a flowchart illustrating a contact determination process.

Next, with reference to flowcharts of FIGS. 3 and 4, description is given of a control executed until a contact response operation is performed based on driving assistance. Steps of the flowcharts indicate a driving assistance method. This control may be executed by the ECU 11 by the CPU 111 performing processing in accordance with a program held in the memory 112. This program may be held in a non-transitory computer readable recording medium.

A driving assistance process illustrated in FIG. 3 may be started and repeatedly executed at predetermined time intervals. In step S1, the ECU 11 may determine whether the target vehicle VS as a determination target has been recognized. The ECU 11 may analyze the images captured by the two cameras 12 and the data detected by the two radar sensors 13. If the ECU 11 determines that the target vehicle VS as a determination target has been recognized (YES in step S1), the ECU 11 may cause the flow to proceed to step S2. If the ECU 11 does not determine that the target vehicle VS has been recognized (NO in step S1), the ECU 11 may end the process.

In the vehicle VM, a yaw rate Yr may be calculated based on a speed, a lateral acceleration rate, and a steering wheel rotation angle detected of the vehicle VM. In step S2, if an absolute value of the yaw rate Yr is continuously greater than or equal to a turning reference value for a predetermined period (YES in step S2), the ECU 11 may cause the flow to proceed to step S3, and perform a contact determination process at the time of turning. Otherwise (NO in step S2), the ECU 11 may end the process, and wait for the start time of the next driving assistance process.

Figure 5:
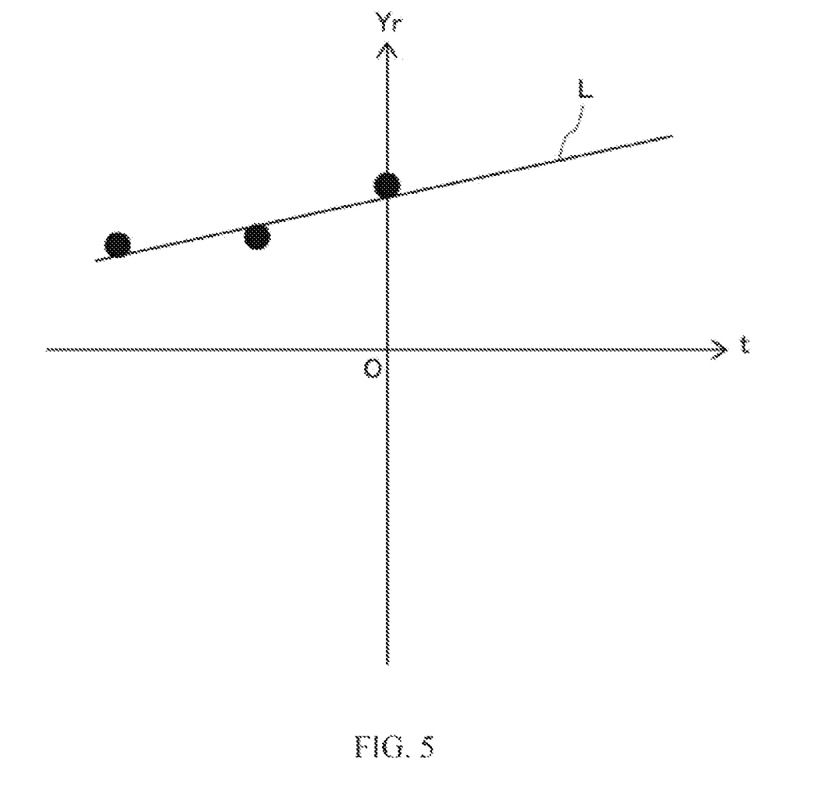
FIG. 5 is a diagram illustrating calculation of a yaw rate change rate.

Description is given of a flow of the contact determination process in step S3 with reference to FIG. 4. In step S31, the ECU 11 may calculate a yaw rate change rate Yrc based on the yaw rate Yr of the vehicle VM at multiple time points. In the example embodiment, the ECU 11 may calculate an expression of a straight line L by a least squares method, based on the yaw rate Yr at three time points in total of past two time points and a current time (t=0), indicated by black circles in FIG. 5. The yaw rate change rate Yrc may be a slope of the straight line L. As the yaw rate Yr, values at four or more time points may be used for calculation of the expression of the straight line L, or the yaw rate Yr at two time points may be coupled and used for calculation of the expression of the straight line L. When the straight line L is inclined, in other words, when the yaw rate change rate Yrc is a value other than 0 (zero), the predicted path is a clothoid curve. By using the expression of the straight line L, it is possible for the ECU 11 to calculate a sequential position of the vehicle VM as an own vehicle position, assuming that the yaw rate change rate Yrc is kept after the current time that is the prediction reference time Ts. The ECU 11 may thus obtain the own vehicle middle predicted path MC as the predicted path of the vehicle VM. In one embodiment, the own vehicle position may serve as a "first vehicle position".

In subsequent step S32, the ECU 11 may calculate a time when the vehicle VM turns by a setting angle of 90° with the yaw rate change rate Yrc kept, as a prediction end time Te. In the example embodiment, predictions may be made until the vehicle VM turns by 90°. The setting angle may be 90° in the example embodiments, but may be another angle.

In subsequent step S33, the ECU 11 may recognize the images obtained from the cameras 12 by using also the data detected by the radar sensors 13, and determine a rectangle occupied by the target vehicle VS on a horizontal plane as a target vehicle rectangle. The target vehicle rectangle may differ in size and shape, depending on whether the target vehicle VS is recognized as a small-sized vehicle or as a large-sized vehicle in the images. The memory 112 may hold multiple target vehicle rectangles, and the target vehicle rectangle may be selected based on image recognition. In addition, the ECU 11 may calculate the position, a speed, and a direction of the target vehicle VS by recognizing the images at multiple time points. A rectangle occupied by the vehicle VM on the horizontal plane, i.e., an own vehicle rectangle, may be held in the memory 112 as a setting value. The speed of the vehicle VM at the current time may also be held in the memory 112 based on measurement.

In subsequent step S34, the ECU 11 may calculate places of the vehicle VM and the target vehicle VS at a prediction time t after elapse of the time period Δt. The own vehicle position of the vehicle VM and a target vehicle position of the target vehicle VS may be expressed by rectangles as illustrated in FIG. 2. Coordinates obtained here may be based on the position and the direction of the vehicle VM at the current time as illustrated in FIG. 2. The ECU 11 may calculate the own vehicle rectangle of the vehicle VM at the prediction time t after elapse of the time period Δt, based on the yaw rate Yr predicted assuming that the speed and the yaw rate change rate Yrc of the vehicle VM are constant. In addition, the ECU 11 may calculate the target vehicle rectangle after elapse of the time period Δt, assuming that the target vehicle VS travels in a uniform linear motion, by using the calculated position, speed, and direction. In this manner, the rectangles of the vehicle VM1 and the target vehicle VS1 at the prediction time t after elapse of the time period Δt from the current time may be predicted as the own vehicle position and the target vehicle position, as indicated by dotted-line frames in FIG. 2. In one embodiment, the target vehicle position may serve as a "second vehicle position".

In subsequent step S35, the ECU 11 may determine whether the own vehicle rectangle and the target vehicle rectangle, i.e., the rectangles indicating the own vehicle position of the vehicle VM and the target vehicle position of the target vehicle VS, have overlapping portions. This determination allows the ECU 11 to determine whether the vehicle VM and the target vehicle VS come into contact with each other, based on presence or absence of a contact position where the own vehicle position contacts the target vehicle position. The own vehicle rectangle may be expressed by expressions of four straight lines within limited ranges. This similarly applies to the target vehicle rectangle. Accordingly, it is possible to determine whether there are overlapping portions by, for example, determining whether there is a solution of a simultaneous equation of the expressions of the straight lines of the own vehicle rectangle and the expressions of the straight lines of the target vehicle rectangle. The vehicle VM1 and the target vehicle VS1 in FIG. 2 have no overlapping portions (NO in step S35). In this case, the ECU 11 may cause the flow to proceed to step S36.

In step S36, the ECU 11 may determine whether the prediction time t has reached the prediction end time Te. If the prediction time t has not reached the prediction end time Te (NO in step S36), the ECU 11 may cause the flow to return to step S34. By thus repeating steps S34 to S36, the ECU 11 may repeatedly determine whether the rectangles of the own vehicle position of the vehicle VM and the target vehicle position of the target vehicle VS overlap with each other at the sequential prediction time t that arrives each time the time period Δt elapses. The determination may be repeated until the rectangles of the own vehicle position and the target vehicle position overlap with each other, or until the prediction end time Te elapses.

Figure 6:
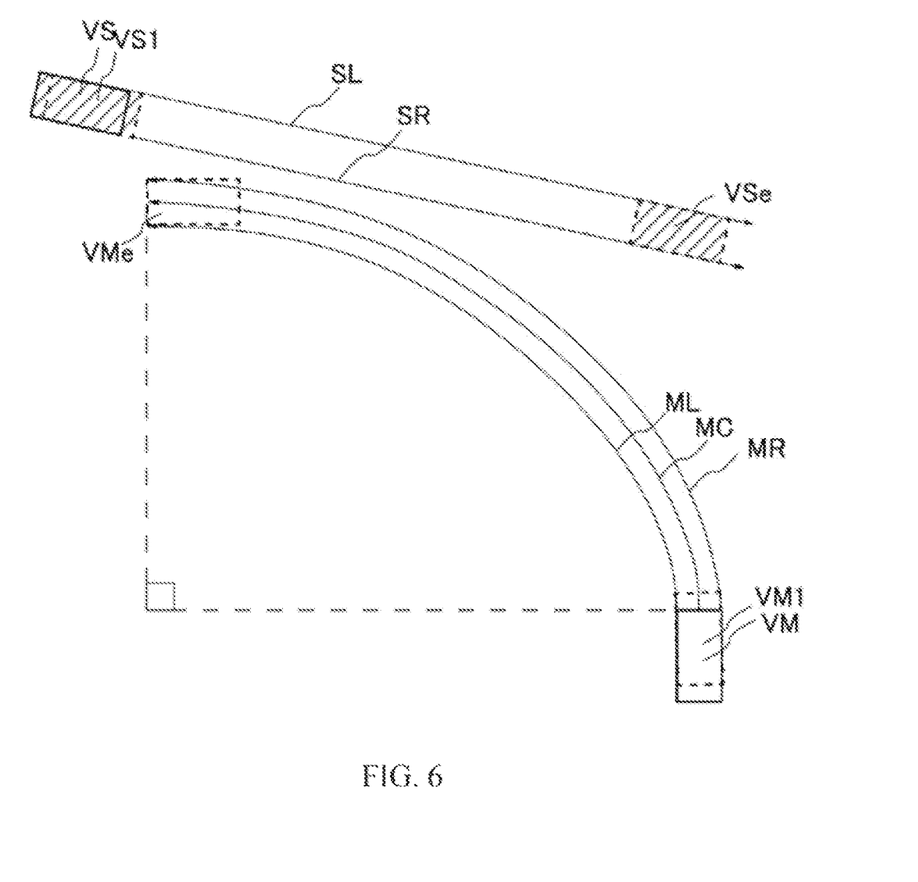
FIG. 6 is a diagram illustrating traveling routes in a case where no contact is predicted until a prediction end time.

If the own vehicle rectangle and the target vehicle rectangle do not overlap with each other until the prediction end time Te (YES in step S36), the ECU 11 may end the contact determination process in step S3. FIG. 6 illustrates predicted traveling routes in a case where the rectangles do not overlap with each other until the prediction end time Te. A vehicle VMe and a target vehicle VSe indicate the rectangles of the own vehicle position and the target vehicle position at the prediction end time Te. The vehicle VM and the target vehicle VS indicated by solid lines may be the current positions. The vehicle VM1 and the target vehicle VS1 indicated by dotted lines may be the predicted positions of the vehicle VM and the target vehicle VS after elapse of the time period Δt. Curves indicate the predicted paths of the respective parts of the vehicle VM. ML, MC, and MR may respectively be the predicted paths of the front left end, the front middle, and the front right end of the vehicle VM. SL and SR may respectively be the predicted paths of the front left end and the front right end of the target vehicle VS.

In contrast, if the rectangles of the own vehicle position and the target vehicle position overlap with each other, like the vehicle VMn and the target vehicle VSn in FIG. 2 (YES in step S35 in FIG. 4), the ECU 11 may cause the flow to proceed to step S37. In step S37, the ECU 11 may store data indicating that contact occurs, and end the contact determination process in step S3.

In this manner, the ECU 11 predicts the sequential position of the vehicle VM as the own vehicle position assuming that the yaw rate change rate Yrc is kept constant, and predicts a sequential position of the target vehicle VS as the target vehicle position. The ECU 11 determines whether the vehicle VM and the target vehicle VS come into contact with each other, based on presence or absence of the contact position where the sequential own vehicle position partly overlaps with the target vehicle position. When the ECU 11 determines that no contact occurs until the prediction end time Te, i.e., the time when the vehicle VM turns by the setting angle, the ECU 11 ends prediction of the sequential own vehicle position and the target vehicle position. As described above, the own vehicle position is predicted by using the yaw rate change rate Yrc. Thus, it is possible to make a prediction with a small amount of calculation, making it possible to suppress a processing load on the CPU 111.

When step S3 ends, the ECU 11 may cause the flow to proceed to step S4 in FIG. 3. In step S4, the ECU 11 may determine whether data indicating that contact occurs is held and an emergency level for response is high. For example, if the contact time when the rectangles overlap with each other is a time after elapse of a predetermined time period or more from the current time, or the prediction reference time Ts, the ECU 11 may not perform an automatic contact response operation, because there is sufficient time before contact. Also if no data indicating that collision occurs is held, the ECU 11 may not perform an automatic contact response operation. If a result of the determination in step S4 is NO based on, for example, the emergency level, the ECU 11 may end the process, and wait for start of the next driving assistance process. If the result of the determination in step S4 is YES, the ECU 11 may perform the contact response operation in step S5 and end the process. In the example embodiments, the ECU 11 may send a braking command to the braking device 2 to activate braking, as the contact response operation.

In the example embodiments, using 90° as the setting angle, the time when the vehicle VM turns by 90° may be set as the prediction end time, but the setting angle may be another angle. The setting angle may be set to an angle greater than or equal to 45° and less than or equal to 180°, and the time when the own vehicle turns by the setting angle may be set as the prediction end time.

In addition, in the example embodiments, the position, etc. of the target vehicle VS may be detected based on data obtained from the cameras 12 and the radar sensors 13. In some embodiments, the position, etc. of the target vehicle VS may be detected based on data obtained from either the cameras 12 or the radar sensors 13. The position, etc. of the target vehicle VS may be detected based on data obtained from all or a portion of the cameras 12, the radar sensors 13, and other devices.

In the example embodiments, in step S2, the yaw rate Yr to be used to determine whether to start the contact determination process by being compared with the turning reference value may be calculated based on the detected speed, lateral acceleration rate, and steering wheel rotation angle of the vehicle VM. This similarly applies to the yaw rate Yr to be used to calculate the yaw rate change rate Yrc in step S31. In some embodiments, one or both of these yaw rates Yr may be calculated by performing correction based on the yaw rate change rate Yrc calculated based on the past yaw rate Yr.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

Positions of an own vehicle where a yaw rate change rate is kept are indicated by a clothoid curve. A sequential position of the own vehicle is predicted as an own vehicle position, from a prediction reference time to a prediction end time that is a time when the own vehicle turns by a setting angle. According to at least one embodiment of the disclosure, this makes it possible to determine whether the own vehicle and a target vehicle come into contact with each other, based on presence or absence of a contact position with the target vehicle.

As used herein, the term "collision" may be used interchangeably with the term "contact".

The ECU 11 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the ECU 11. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the ECU 11 illustrated in FIG. 1.

The invention claimed is:

1. A driving assistance apparatus comprising an electronic control unit configured to:
   calculate a yaw rate change rate of a first vehicle to which the driving assistance apparatus is to be applied, based on a yaw rate of the first vehicle obtained at multiple time points;
   predict a sequential position of the first vehicle as a first vehicle position assuming that the yaw rate change rate is kept constant;
   predict a sequential position of a second vehicle as a second vehicle position;
   determine whether the first vehicle and the second vehicle come into contact with each other, based on presence or absence of a contact position where the first vehicle position partly overlaps with the second vehicle position; and
   end prediction of the first vehicle position and the second vehicle position, when the electronic control unit determines that no contact occurs between the first vehicle and the second vehicle until a prediction end time, the prediction end time being defined as a time at which the first vehicle turns by a setting angle.

2. The driving assistance apparatus according to claim 1, wherein the electronic control unit is configured to obtain the yaw rate change rate, based on the yaw rate obtained at two time points.

3. The driving assistance apparatus according to claim 1, wherein the electronic control unit is configured to obtain the yaw rate change rate by a least squares method, based on the yaw rate obtained at three or more time points.

4. The driving assistance apparatus according to claim 1, wherein the first vehicle position comprises a rectangle occupied by the first vehicle on a horizontal plane, and the second vehicle position comprises a rectangle occupied by the second vehicle on the horizontal plane.

5. The driving assistance apparatus according to claim 2, wherein the first vehicle position comprises a rectangle occupied by the first vehicle on a horizontal plane, and the second vehicle position comprises a rectangle occupied by the second vehicle on the horizontal plane.

6. The driving assistance apparatus according to claim 3, wherein the first vehicle position comprises a rectangle occupied by the first vehicle on a horizontal plane, and the second vehicle position comprises a rectangle occupied by the second vehicle on the horizontal plane.

7. The driving assistance apparatus according to claim 1, wherein the electronic control unit is configured to predict the second vehicle position assuming that the second vehicle travels in a uniform linear motion.

8. The driving assistance apparatus according to claim 2, wherein the electronic control unit is configured to predict the second vehicle position assuming that the second vehicle travels in a uniform linear motion.

9. The driving assistance apparatus according to claim 3, wherein the electronic control unit is configured to predict the second vehicle position assuming that the second vehicle travels in a uniform linear motion.

10. A driving assistance method comprising:

calculating a yaw rate change rate of a first vehicle to which the driving assistance method is to be applied, based on a yaw rate of the first vehicle obtained at multiple time points;

predicting a sequential position of the first vehicle as a first vehicle position assuming that the yaw rate change rate is kept constant;

predicting a sequential position of a second vehicle as a second vehicle position;

determining whether the first vehicle and the second vehicle come into contact with each other, based on presence or absence of a contact position where the first vehicle position partly overlaps with the second vehicle position; and ending prediction of the first vehicle position and the second vehicle position, when a determination is made that no contact occurs between the first vehicle and the second vehicle until a prediction end time, the prediction end time being defined as a time at which the first vehicle turns by a setting angle.

11. A non-transitory computer readable recording medium containing a program, the program causing, when executed by a computer, the computer to implement a method, the method comprising:

calculating a yaw rate change rate of a first vehicle to which the method is to be applied, based on a yaw rate of the first vehicle obtained at multiple time points;

predicting a sequential position of the first vehicle as a first vehicle position assuming that the yaw rate change rate is kept constant;

predicting a sequential position of a second vehicle as a second vehicle position;

determining whether the first vehicle and the second vehicle come into contact with each other, based on presence or absence of a contact position where the first vehicle position partly overlaps with the second vehicle position; and ending prediction of the first vehicle position and the second vehicle position, when a determination is made that no contact occurs between the first vehicle and the second vehicle until a prediction end time, the prediction end time being defined as a time at which the first vehicle turns by a setting angle.

* * * * *